United States Patent
Parkhe

(10) Patent No.: US 8,033,348 B1
(45) Date of Patent: Oct. 11, 2011

(54) SELF-PROPELLED CHILD STROLLER

(76) Inventor: Hemin Parkhe, Nashville, TN (US)

( * ) Notice: Subject to any disclaimer, the term of this patent is extended or adjusted under 35 U.S.C. 154(b) by 170 days.

(21) Appl. No.: 12/384,591

(22) Filed: Apr. 7, 2009

Related U.S. Application Data

(60) Provisional application No. 61/123,078, filed on Apr. 7, 2008.

(51) Int. Cl.
*B62B 9/22* (2006.01)
(52) U.S. Cl. .................................. 180/19.1; 180/19.3
(58) Field of Classification Search ............... 180/19.1, 180/19.2, 19.3
See application file for complete search history.

(56) References Cited

U.S. PATENT DOCUMENTS

| | | | | |
|---|---|---|---|---|
| 4,629,950 A | * | 12/1986 | Ching | 318/285 |
| 5,494,126 A | | 2/1996 | Meeker | |
| 5,873,425 A | * | 2/1999 | Yang | 180/65.6 |
| 5,937,961 A | * | 8/1999 | Davidson | 180/166 |
| 6,139,046 A | * | 10/2000 | Aalund et al. | 280/642 |
| 6,148,942 A | * | 11/2000 | Mackert, Sr. | 180/65.6 |
| 6,360,836 B1 | * | 3/2002 | Milano et al. | 180/65.6 |
| 6,983,813 B1 | * | 1/2006 | Wright | 180/11 |
| 7,198,122 B1 | * | 4/2007 | Smith | 180/12 |
| 7,278,652 B2 | * | 10/2007 | Riedl et al. | 280/642 |
| 2001/0013688 A1 | * | 8/2001 | Warner et al. | 280/47.38 |
| 2006/0071453 A1 | * | 4/2006 | Myers et al. | 280/652 |
| 2007/0257526 A1 | * | 11/2007 | Hei et al. | 297/184.13 |
| 2008/0203757 A1 | * | 8/2008 | Gilberg | 296/100.16 |

* cited by examiner

*Primary Examiner* — Anne Marie Boehler
*Assistant Examiner* — Michael Stabley
(74) *Attorney, Agent, or Firm* — Montgomery Patent & Design; Robert C. Montgomery; Joseph T. Yoksich

(57) ABSTRACT

A self-propelled stroller apparatus comprising a motor, a drive train, a braking mechanism, and a set of hand controls, is herein disclosed. Two (2) rear wheels of the stroller are driven by a battery-powered motor utilizing a chain-driven drive train. The motor is controlled by a handlebar-mounted control lever, which when pushed motivates the stroller in a forward direction. During times when the motor and drive train are deactivated, the stroller may be pushed in a normal manner. The apparatus is additionally provided with an emergency braking system to stop or securely park the stroller. The battery is recharged by a normal household outlet and an electrical cord when the stroller is not in use.

17 Claims, 7 Drawing Sheets

SELF-PROPELLED CHILD STROLLER

RELATED APPLICATIONS

The present invention was first described in and claims the benefit of U.S. Provisional Application No. 61/123,078, filed Apr. 7, 2008, the entire disclosures of which are incorporated herein by reference.

FIELD OF THE INVENTION

The present invention relates generally to an organizer for motor vehicles and, more particularly, to a caddy for automobile consoles.

BACKGROUND OF THE INVENTION

There are many products designed to assist caregivers with infants and young children. One (1) of the most common and useful is the children's stroller that carries the child while the caregiver operates the stroller. Conventional strollers are designed for use with newborns up to children five (5) years or older; the stroller does a great job of enabling the caregiver to take the child along for various outings without being required to constantly carry the child. The stroller also prevents the child from wandering off during shopping trips, at amusement parks, or anywhere the parent or care provider typically walks. However, the stroller must still be moved around by the caregiver. Although seemingly an easy task, when one considers the weight of the child, child care items, blankets, extra clothes, food, and the like that is typically transported on a stroller the easy task of pushing the stroller can become quite daunting, especially over long periods of time or distances. Additionally, strollers are often pushed up very steep inclines and are pushed all day long on an almost daily basis; it is easy to see how pushing a stroller alone can tire the caregiver out.

Various attempts have been made in the past to overcome these disadvantages and provide a means for personal pushed transporting devices having motorized push assistance. One (1) solution is the attachment of a motorized add-on to the frame and wheel assemblies of conventional strollers. While drive assembly add-ons can provide a means of push assistance to a stroller they have distinct disadvantages as well. Many use mounting mechanism which can be inconvenient to apply or require regular inspection to ensure proper mounting is maintained. The controller mechanisms may also require mounting or comprise tethered switches which can become cumbersome to keep up with. Many add-ons simply engage the wheels of the strollers, frictionally driving them which can be inefficient in inclement weather. Others only engage a single wheel which can lead to unstable or uneven propulsion. Larger axially driven devices can disturb the weight proportions of the stroller making it less stable and creating a dangerous situation for the child passenger. Among the relevant attempts to address these problems are several U.S. patents, including U.S. Pat. Nos. 4,629,950; 5,494,126; 5,937,961; 6,148,942; 6,983,813; and 7,198,122.

U.S. Pat. No. 5,873,425, issued in the name of Yang, describes a motorized stroller with rear wheel drive assembly comprising a motor and gear housing that is mounted to a rear wheel support rod of the stroller and a roller which makes contact with the tire portion of a rear wheel transporting the rotational motion of the motor to that of the wheel and a tethered control unit.

U.S. Pat. No. 6,360,836, issued in the name of Milano, Jr. et al., describes an add-on drive assembly for baby strollers and carriages comprising a motorized chassis attached to the rear axle of a stroller and a pair of drive wheels which engage the walking surface replacing the rear wheels of the stroller.

While these devices fulfill their respective, particular objectives, each of these references suffers from one or more of the aforementioned disadvantages. Accordingly, there exists a need for a means by which mechanical assistance can be provided to a user of a stroller when needed and the physical effort required to move a stroller can be reduced. The development of the invention herein described fulfills this need.

SUMMARY OF THE INVENTION

In view of the foregoing references, the inventor recognized the aforementioned inherent problems and observed that there is a need for a means by which a baby stroller can be pushed with the assistance of a motorized propelling means without the aforementioned problems and thus, the object of the present invention is to substantially depart from the conventional solutions and to solve the aforementioned disadvantages.

To achieve the above objectives, it is an object of the present invention to provide a stroller assembly comprising a wheeled drive assembly. The drive assembly is controlled by a controller assembly, which when engaged propels the invention in a forward direction. When the controller assembly is released the invention slows to a stop. Additionally, the drive assembly can be deactivated and the invention may be pushed in a conventional manner.

Another object of the stroller assembly is to provide an apparatus comprising a stroller assembly, a drive assembly, a controller assembly, and an emergency brake assembly.

Yet still another object of the stroller assembly is to provide the stroller assembly comprising a conventional folding stroller unit with expected features such as, two (2) rear wheels, two (2) pivoting front wheels, a plurality of tubular frame members, a handlebar member, a passenger compartment, a plurality of foldable hinges, a sunshade, a passenger tray, a harness, a harness buckle, a foot rest, and an insect net.

Yet still another object of the stroller assembly is to provide the drive assembly comprising a battery, a first electrical connector, an AC/DC recharging cord, a second electrical connector, a drive housing, an axle shaft, a chain and sprocket assembly, a DC motor, an electric clutch, and a motor shaft located between the two (2) rear wheels of the stroller assembly which provides a means of propelling the apparatus over an inclined or uneven surface. The drive assembly provides a torque means to the horizontal axle shaft which extends between the rear wheels of the stroller assembly.

Yet still another object of the stroller assembly is to provide the controller assembly comprising a controller housing, a control lever, an ON/OFF switch, an "OFF" indicator light, an "ON" indicator light, and a battery charge indicator which is located along a rearward facing surface of the handlebar member.

Yet still another object of the stroller assembly is to provide the control lever comprising an "L"-shaped appendage which is located adjacent to an operator's thumb or index finger and a spring-return rotary actuator particularly designed to be actuated using a single digit while the operator maintains a secure grasp of the handlebar member.

Yet still another object of the stroller assembly is to provide the emergency brake assembly comprises a pivoting and hinging cable actuator system similar to common bicycle cable devices comprising a brake cable, an emergency brake lever, a lever bracket, a cable fixture, a split cable, a pair of cable fasteners, a first brake lever, a second brake lever, a lever pivot pin, and a pair of brake pads which provides a slowing or stopping means to the apparatus as required by the user.

Yet still another object of the stroller assembly is to provide the brake lever-mounted along a forward-facing side of the handlebar member opposite the controller assembly convenient to a user's fingers.

Yet still another object of the stroller assembly is to provide the chain and sprocket assembly comprising a flange-mount sprocket and a link chain similar to that used on bicycles and motorcycles that extends in a perpendicular direction from the axle shaft to the motor shaft of the DC motor.

Yet still another object of the stroller assembly is to provide the shaft-mounted electric clutch which provides an automatic engagement and disengagement of the chain and sprocket assembly from the motor providing for both a motorized mode and a free-wheeled mode.

Yet still another object of the stroller assembly is to provide the free-wheeled mode during periods when the drive assembly is de-activated conserving the battery charge.

Yet still another object of the stroller assembly is to provide such a stroller assembly in a various sizes which correspond to infants and children of various sizes.

Yet still another object of the stroller assembly is to provide the DC motor which is powered via a rechargeable battery. The rechargeable battery is charged using an available alternating current (AC) source and recharging cord when the apparatus is not in use.

Yet still another object of the stroller assembly is to provide a method of operation which provides for motorized assistance with the pushing of the stroller assembly up hills, for long distances, and in any situation where the weight of the stroller assembly becomes an unnecessary burden.

Further objects and advantages of the stroller assembly will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
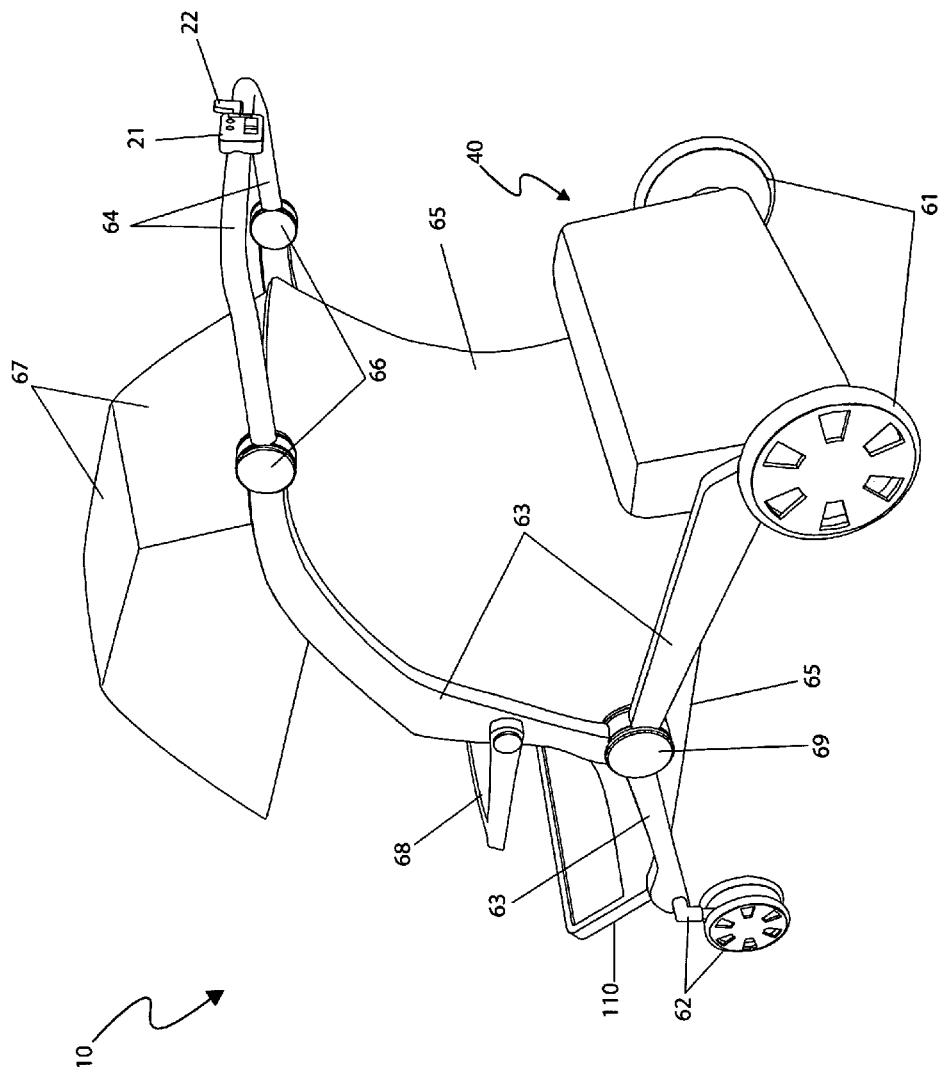
FIG. 1 is a side perspective view of a self-propelled stroller 10, according to a preferred embodiment of the present invention.

| | |
|---|---|
| 10 | self-propelled stroller |
| 20 | controller assembly |
| 21 | controller housing |
| 22 | control lever |
| 23 | ON/OFF switch |
| 24 | "ON" indicator light |
| 25 | "OFF" indicator light |
| 27 | charge indicator |
| 29 | recharge unit |
| 30 | battery |
| 31 | wiring |
| 32 | first electrical connector |
| 33 | AC/DC recharging cord |
| 34 | second electrical connector |
| 40 | drive assembly |
| 41 | drive housing |
| 42 | axle shaft |
| 43 | chain/sprocket assembly |
| 44 | DC motor |
| 45 | brake cable |
| 47 | emergency brake lever |
| 49 | lever bracket |
| 50 | electric clutch |
| 51 | motor shaft |
| 53 | speed control module |
| 60 | stroller assembly |
| 61 | rear wheel |
| 62 | front wheel |
| 63 | frame member |
| 64 | handlebar |
| 65 | passenger compartment |
| 66 | upper hinge |
| 67 | sunshade |
| 68 | tray |
| 69 | lower hinge |
| 70 | emergency brake assembly |
| 71 | wire rope |
| 72 | cable fixture |
| 73 | split cable |
| 74 | cable fasteners |
| 76 | first brake lever |
| 77 | second brake lever |
| 78 | lever pivot pin |
| 79 | brake pad |
| 80 | rotor |
| 90 | fastener |
| 100 | harness |
| 105 | harness buckle |
| 110 | foot rest |
| 115 | insect net |

DETAILED DESCRIPTION OF THE PREFERRED EMBODIMENT

The best mode for carrying out the invention is presented in terms of its preferred embodiment, herein depicted within the FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a self-propelled stroller (herein described as the "apparatus") 10, comprising two (2) rear wheels 61 driven by a direct current (DC) motor 44 using a chain and sprocket drive train 43. The DC motor 44 is controlled by a handlebar-mounted control lever 22 which, when pushed forward, causes the stroller 60 to accelerate forward thereto a desired speed. When the control level 22 is released the stroller 60 relies on manual operation or slows to a stop. Additionally, an emergency brake lever 47 is provided to slow or stop the apparatus 10, as needed. The DC motor 44 is powered via a rechargeable battery 30 which is charged using an available alternating current (AC) source and recharging cord 33 when the stroller 60 is not in use.

Figure 2:
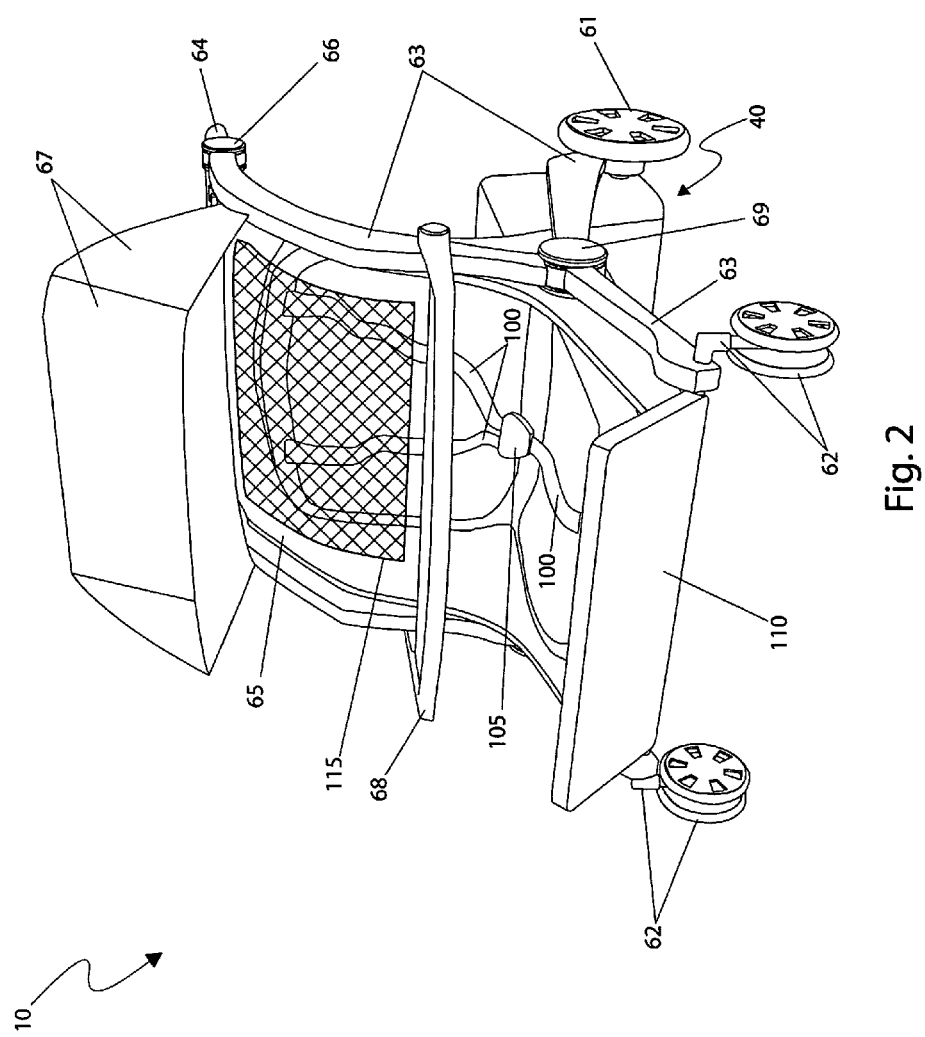
FIG. 2 is a front perspective view of a self-propelled stroller 10, according to a preferred embodiment of the present invention.

Referring now to FIGS. 1 and 2, side and front perspective views of the apparatus 10 according to a preferred embodiment of the present invention, are disclosed. The apparatus 10 comprises a stroller assembly 60, a drive assembly 40, a controller assembly 20, a brake lever 47, and an emergency brake assembly 70.

The stroller assembly 60 is envisioned to be a conventional folding unit providing standard expected features such as, but not limited to: two (2) rear wheels 61, two (2) pivoting front wheels 62, a plurality of tubular plastic or metal frame members 63, a pushing handlebar 64, a textile passenger compartment 65, a pair of upper hinges 66, a pair of lower hinges 69, a sunshade 67, a passenger tray 68, a harness 100, a harness buckle 105, a foot rest 110, and an insect net 115. The stroller assembly 60 is envisioned being made using rugged and corrosion-resistant materials such as plated steel, injection-molded plastic, water-proof textile portions, and the like, being common in the industry. The stroller assembly 60 is envisioned to be a common folding unit capable of collapsing vertically thereabout said hinges 66, 69, thereby resulting in a compact low-profile form convenient for storage and transportation thereof in a motor vehicle. The pushing handlebar 64 comprises a tubular "U"-shaped member extending in a horizontal plane thereat a convenient and ergonomic height for manually pushing the apparatus 10. The pushing handlebar 64 further provides an attachment thereto the controller assembly portion 20 and the brake lever portion 47 (see FIGS. 3a and 3b). The passenger compartment 65 comprises a sewn textile assembly fabricated using conventional processes and envisioned to be made using easily washable and durable coated or impregnated materials such as vinyl, canvas, synthetic cloth, natural cloth, or the like. The passenger compartment 65 further comprises a sitting or reclining form providing a comfortable position thereto an occupying infant. The sunshade portion 67 comprises an umbrella-shaped textile panel envisioned to be affixed thereto an expanding rod frame and capable of hinging upwardly as well as being removed. The passenger tray 68 provides a semi-circular horizontal platform attached thereto opposing side frame members 63 providing an area to support toys, food, and such in an expected manner. The stroller assembly further comprises a harness 100 with an integral buckle 105. Said harness 100 and buckle 105 comprise strong crotch and shoulder strapping being joined via the multi joining buckle 105 at a central location thereupon an occupying infant's torso being convenient thereto a caregiver. The footrest 110 comprises a rigid structure being affixed thereto the stroller frame member 63 and extending therebetween the front wheels 62 providing a conventional footrest function to stabilize particularly a toddler while being conveyed in the apparatus 10. The apparatus further comprises an insect net 115 comprising a rectangular section of screen or mesh netting material being affixed thereto an upper rearward portion of the passenger compartment 65. In use, the insect net 115 may be draped down over the occupying infant when desired, thereby protecting said infant while in locations which present a threat of airborne pests such as flies, mosquitoes, or the like. The stroller assembly 60 is envisioned being introduced in a number of sizes which correspond thereto infants and children of various sizes and as such should not be interpreted as a limiting factor of the apparatus 10.

Figure 3A:
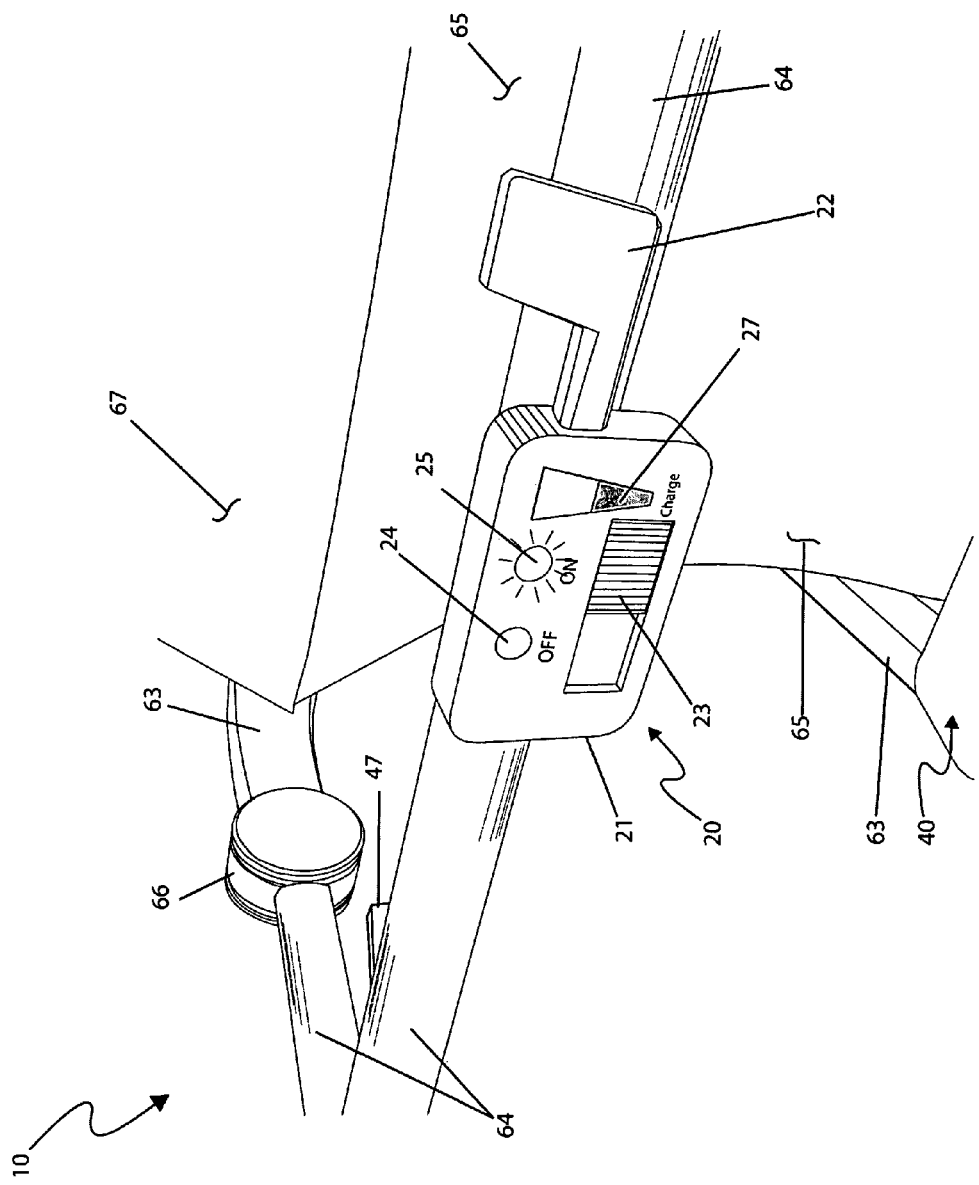
FIG. 3a is a close-up view of a controller assembly portion 20 of a self-propelled stroller 10, according to a preferred embodiment of the present invention.

The apparatus 10 provides a motorized motivating means via a drive assembly 40 located therebetween the two (2) rear wheels 61, thereby allowing a user to propel the apparatus 10 over a level or inclined surface by pressing a handlebar-mounted control lever portion 22 (see FIG. 3a). Also affixed thereto the handlebar area 64 is an emergency brake lever 47 providing a slowing or stopping means thereto the apparatus 10 as needed (see FIG. 3b). The apparatus 10 also provides normal manual pushing type motivation during such times that the drive assembly 40 is de-energized (see FIG. 4).

Referring now to FIG. 3a, a close-up view of a controller assembly portion 20 of the apparatus 10, according to a preferred embodiment of the present invention, is disclosed. Located along a rearward facing surface of the handlebar member 64 is a controller assembly 20 comprising a controller housing 21, a control lever 22, an ON/OFF switch 23, an "OFF" indicator light 24, an "ON" indicator light 25, and a battery charge indicator 27. The controller housing 21 provides a secure and protective enclosure thereto electrical components contained therein. The controller housing 21 is envisioned being made using durable shock-resistant plastic securely affixed thereto the handlebar member 64 using methods such as, but not limited to: common fasteners, clamps, or may be integrally molded thereinto said handlebar member 64. The controller housing 21 provides a mounting surface thereto an ON/OFF switch 23 comprising corresponding and adjacent indicating lights 24, 25 also located along a rearward-facing vertical surface. The ON/OFF switch 23 provides a signal voltage thereto the mechanical drive assembly 40 (see FIG. 4), and is envisioned being a common two-position rocker-type switch. The indicating lights 24, 25 comprise common surface-mounted illuminating devices such as incandescent or LED bulbs and provide an operator of the apparatus 10 visual indication of a respective idle or energized state of the drive assembly 40. The charge indicator 27 provides the operator a visual graphical display of remaining electrical power therewithin the battery portion 30 of the apparatus 10. The charge indicator 27 is envisioned to comprise a plurality of light emitting diodes (LED) or a single liquid crystal display (LCD) depicting an illuminated proportional scale which communicates said remaining electrical power by utilizing a common ammeter device. The controller housing 21 further comprises a digit-operated control lever 22 which extends horizontally therefrom said controller housing 21. The control lever 22 comprises an "L"-shaped appendage being convenient thereto an operator's right hand thumb or index finger and comprising a spring-return rotary actuator via an upwardly extending appendage particularly designed to be actuated using a single digit while said operator maintains a secure grasp of the handlebar portion 64 with both hands. The rotary control lever 22 comprises a heavy-duty quarter-turn electrical rheostatic switching device, thereby delivering a proportional signal voltage thereto the speed control module 53 (see FIG. 6).

Figure 3B:
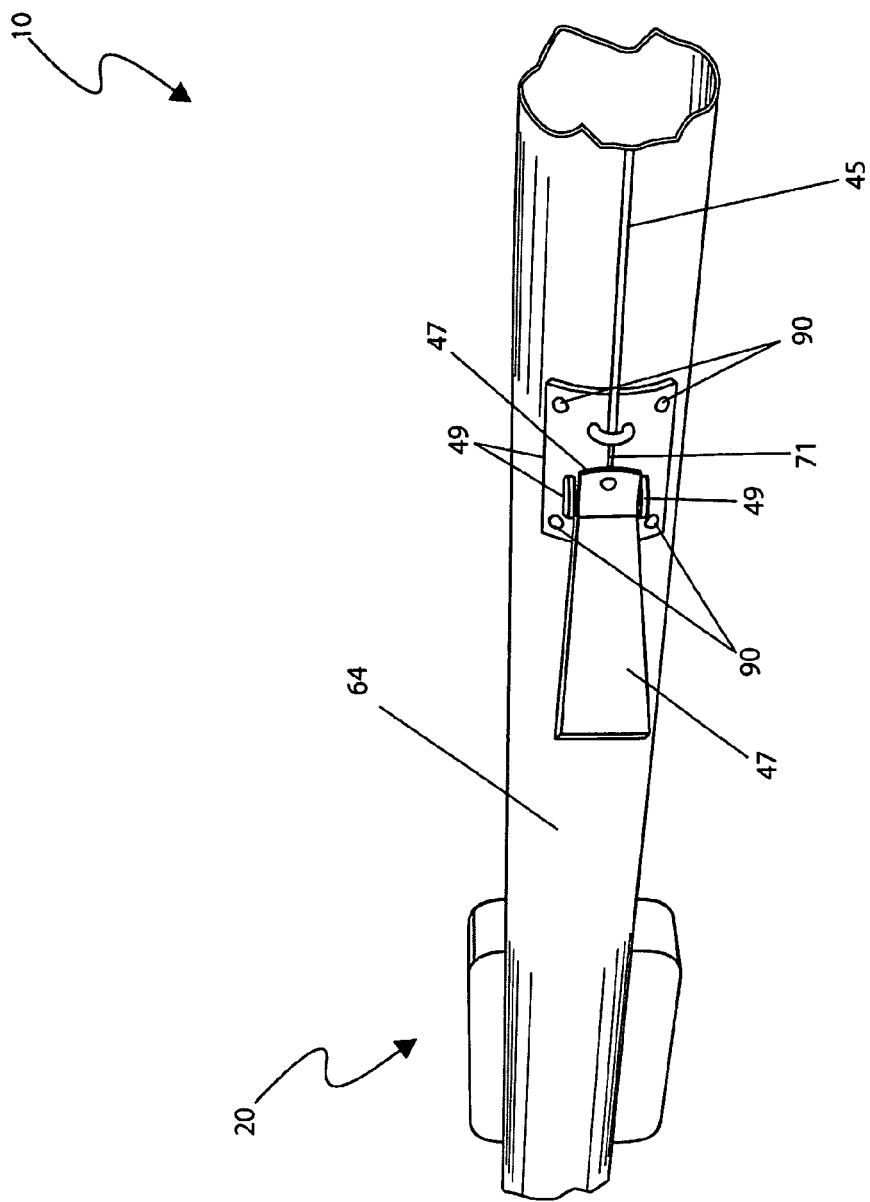
FIG. 3b is a close-up view of a brake lever portion 47 of a self-propelled stroller 10, according to a preferred embodiment of the present invention.

Referring now to FIG. 3b, a close-up view of an emergency brake lever portion 47 of the apparatus 10, according to a preferred embodiment of the present invention, is disclosed.

The apparatus 10 comprises a brake cable 45, an emergency brake lever 47, and a lever bracket 49. The emergency brake lever 47 is mounted therealong a forward-facing side of the handlebar portion 64 approximately opposite the controller assembly 20 being affixed thereto said handlebar portion 64 via a lever bracket 49 using common fasteners 90 such as rivets, screws, or the like. The brake lever 47 is envisioned to be positioned along said handlebar portion 64 so as to be convenient thereto a user's left hand fingers. The brake lever 47 comprises a common pivoting and hinging cable actuator similar thereto common bicycle cable devices common in the industry. The emergency brake lever 47 hingedly extends forwardly in an angular fashion therefrom said handlebar portion 64 being activated by manually squeezing the brake lever 47 inwardly towards the handlebar 64. Activation of the emergency brake lever 47 results in a displacement of the attached brake cable 45, thereby communicating a linear force thereto the emergency brake assembly 70 located therewithin a drive housing 41 portion of the drive assembly 40 (see FIG. 4).

Figure 4:
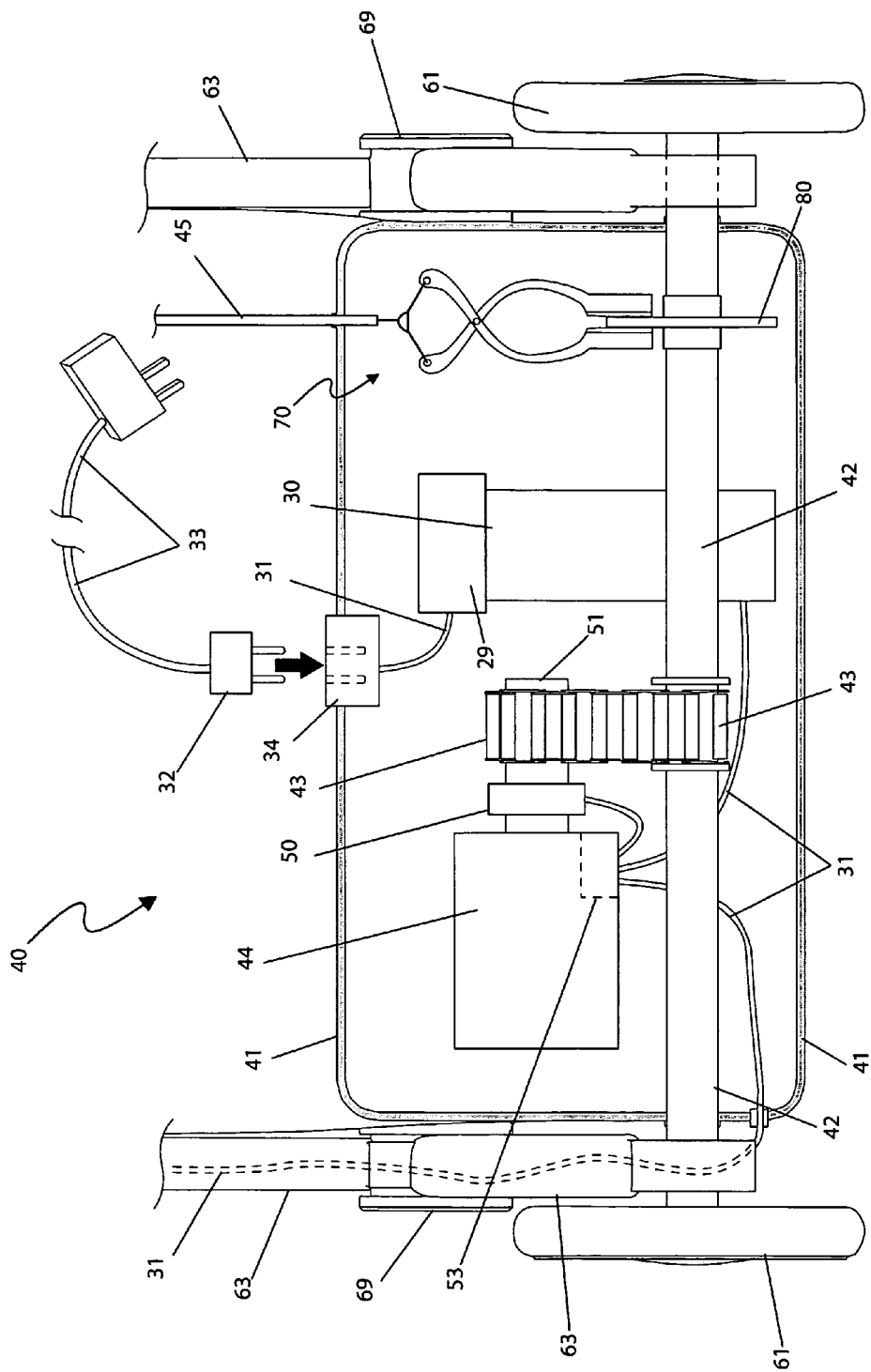
FIG. 4 is a cut-away view of a drive assembly portion 40 of a self-propelled stroller 10 taken along section line A-A (see FIG. 1), according to a preferred embodiment of the present invention.

Referring now to FIG. 4, a cut-away view of a drive assembly portion 40 of the apparatus 10 taken along section line A-A (see FIG. 1), according to a preferred embodiment of the present invention, is disclosed. The drive assembly 40 comprises a battery 30, a first electrical connector 32, an AC/DC recharging cord 33, a second electrical connector 34, a drive housing 41, an axle shaft 42, a chain/sprocket assembly 43, a DC motor 44, an electric clutch 50, a motor shaft 51, and an emergency brake assembly 70. The drive assembly 40 provides a motorized forward propelling means thereto the apparatus 10 while allowing an operator to alternately propel said apparatus 10 in a normal manual manner.

The drive housing 41 provides a protective metal or plastic enclosure thereto a plurality of contained mechanical and electrical components, thereby sealing out dirt, dust, weather elements, and the like. The drive housing 41 comprises a rugged structure having a generally cylinder shape of which a long straight side portion thereof extends therebetween the rear wheels 61 encompassing a portion of the axle shaft 42. The drive housing 41 is anchored and integrated thereinto the stroller frame members 63 along a lower rear portion thereof. The drive assembly 40 provides a torque means thereto the horizontal axle shaft 42 which extends therebetween the rear wheels 61 of the stroller assembly 60. Said axle shaft 42 is in mechanical communication therewith said drive assembly 40 via a vertical chain/sprocket assembly 43 located at an intermediate position along said axle shaft 42. The chain/sprocket assembly 43 comprises standard flange-mount sprockets and a link chain similar to that used on bicycles and motorcycles. The chain/sprocket assembly 43 extends in a perpendicular direction therefrom said axle shaft 42 thereto the motor shaft portion 51 of the DC motor 44. The DC motor 44 is preferably, but not essentially, a one-half (½) to one (1) horsepower commercially available unit having integral gear reduction, if required. The DC motor 44 is capable of providing a sufficient torque thereto said axle shaft 42 so as to propel the stroller assembly 60 and occupying infant or child. The motor output shaft portion 51 of the DC motor 44 provides a conventional shaft-mounted electric clutch 50 providing automatic engagement and disengagement of the chain/sprocket assembly 43 therefrom said DC motor 44, thereby providing motorized motion or free-wheeling of the apparatus 10. Single-direction motorized motion is accomplished when the motor 44 is actuated using the ON/OFF switch 23 and the control lever 22 is pressed. A free-wheeling mode is available during periods when the DC motor portion 44 of the apparatus 10 is de-activated, thereby conserving a battery charge 30. The apparatus 10 is illustrated here depicting a preferred embodiment comprising a chain/sprocket assembly 43 type drive mechanism; however, it is understood that various types of drive methods and associated drive components may be provided such as, but not limited to: gear drive, belt drive, direct drive, or the like, without deviating from the concept and as such should not be interpreted as a limiting factor of the apparatus 10.

Electrical power is provided thereto the DC motor 44 via a rechargeable battery 30 located therewithin said drive housing 41. The battery 30 comprises a large rechargeable deep-cycle battery similar to units used in marine applications providing a long duration current thereto the DC motor 44, thereby increasing a time between charging. Recharging the battery 30 is accomplished via a removably attachable AC/DC recharging cord 33 providing a charging current via connection of a distal portion thereto a 110-volt AC household circuit during periods of time when the apparatus 10 is not in use. Said AC/DC recharging cord 33 further comprises a first connector 32 thereat a proximal end providing a removably connected attachment thereto a second electrical connector 34 being integrated thereinto and mounted thereupon a top outer surface of the drive housing 41. The first 32 and second 34 electrical connectors comprise common respective male and female multi-pin connectors capable of conducting an anticipated current flow required during a battery charging cycle. Said second electrical connector 34 is in electrical communication therewith a recharge unit 29 comprising a standard voltage conditioning module to charge the battery 30. Electrical interconnection therebetween the controller assembly 20, recharge unit 29, battery 30, second electrical connector 34, motor 44, and clutch 50 is accomplished via internal wiring 31 comprising a plurality of common connectors and insulated copper conductors in an expected manner.

The emergency brake assembly 70 resides therein the drive housing 41 being in mechanical communication therewith the aforementioned brake cable 45. The emergency brake assembly 70 provides sufficient braking horsepower directly thereto a rotor portion 80 of the axle shaft 42 and is illustrated here in a preferred embodiment being a center-pull cable-actuated disc brake assembly acting thereupon said rotor 80 (see FIG. 5); however, the emergency brake assembly 70 described above is not limited to the illustrated embodiment, and a person skilled in the art will appreciate that many other brake systems comprising various mechanisms are possible without deviating from the basic concept and as such should not be interpreted as a limiting factor of the apparatus 10.

Figure 5:
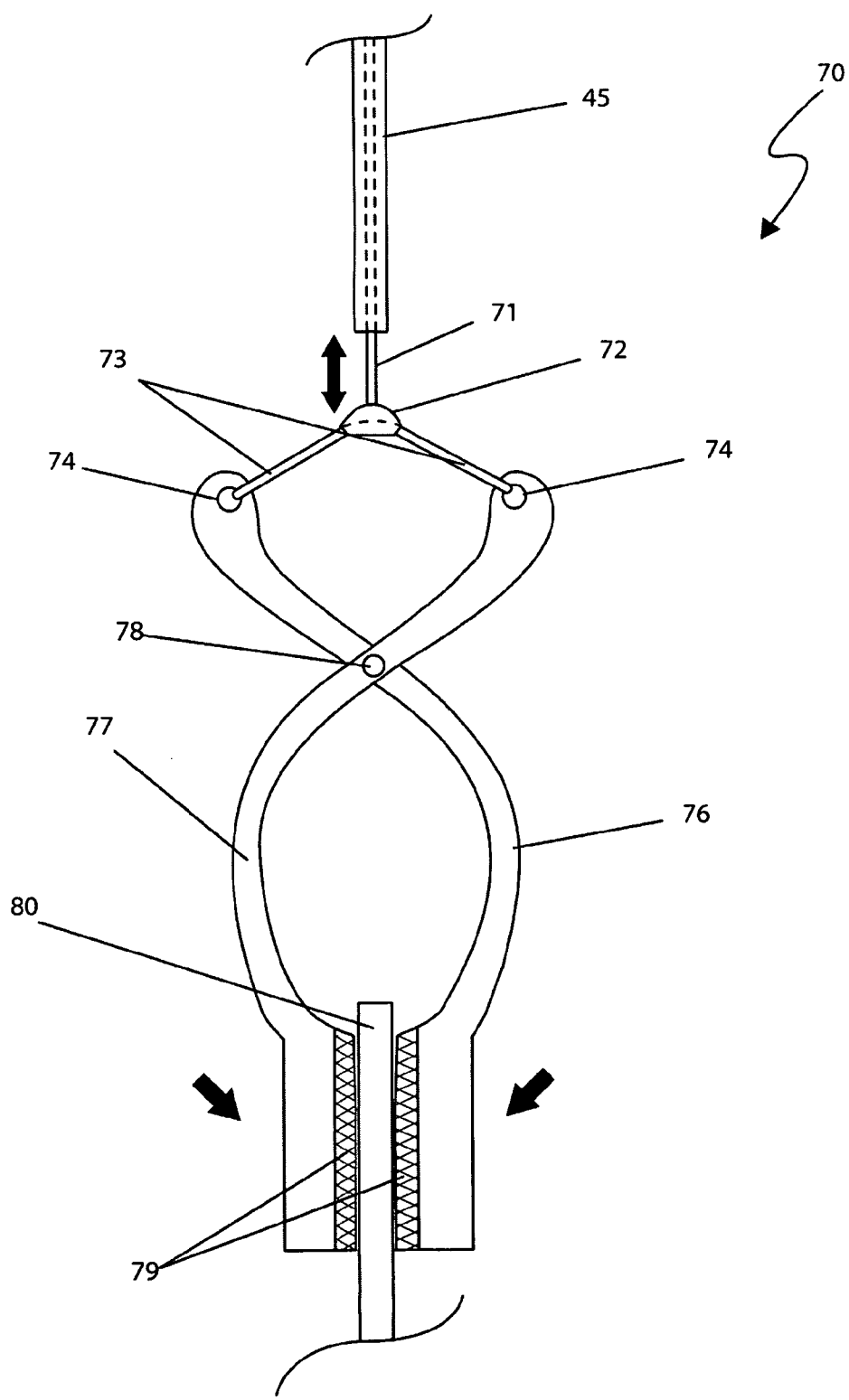
FIG. 5 is a close-up view of an emergency brake assembly portion 70 of a self-propelled stroller 10, according to a preferred embodiment of the present invention; and, FIG. 6 is an electrical block diagram depicting control and drive portions of the apparatus 10, according to a preferred embodiment of the present invention.

FIG. 5 is a close-up view of an emergency brake assembly portion 70 of a self-propelled stroller 10, according to a preferred embodiment of the present invention, is disclosed. The emergency brake assembly 70 is actuated by, and works in conjunction therewith the brake cable 45 to provide an emergency stopping means thereto the apparatus 10 as well as provide a means to temporarily hold the apparatus 10 therein a stationary position. The emergency brake assembly 70 is located therewithin the drive housing 41 and comprises a cable fixture 72, a split cable 73, a pair of cable fasteners 74, a first brake lever 76, a second brake lever 77, a lever pivot pin 78, and a pair of brake pads 79. Said emergency brake assembly 70 is actuated by an inner wire rope portion 71 of the brake cable 45 and provides a mechanical center-pull cable-actuated braking means similar to systems found on touring bicycles. The force applied thereto the wire rope 71 thereby the emergency brake lever 47 is bifurcated thereinto two (2) cable attachments via the cable fixture 72 and split cable 73. The split cable 73 is routed therethrough said cable fixture 72 and attached thereto respective upper end portions of the first 76 and second 77 brake levers using common cable fasteners 74. The first 76 and second 77 brake levers form a center-pivoting scissors-like device being pivotally joined at an intermediate location via a lever pivot pin 78. The pivot pin 78 further provides a stable anchoring means thereto the emergency brake assembly 70 via a molded or welded attachment thereto an inner side surface of the drive housing 41. When actuated by pressing the aforementioned emergency brake lever 47, said first 76 and second 77 brake levers are pulled theretoward each other, thereby correspondingly pressing the two (2) integral brake pads 79 inwardly thereagainst opposite side portions of the rotor 80 to effectively slow or stop the apparatus 10. The brake pads 79 are envisioned to be permanently affixed thereto a flat inward facing surface of the first 76 and second 77 brake levers thereat a bottom end portion using suitable adhesives. The brake pads 79 are envisioned being made using traditional impregnated resin compounds.

Figure 6:
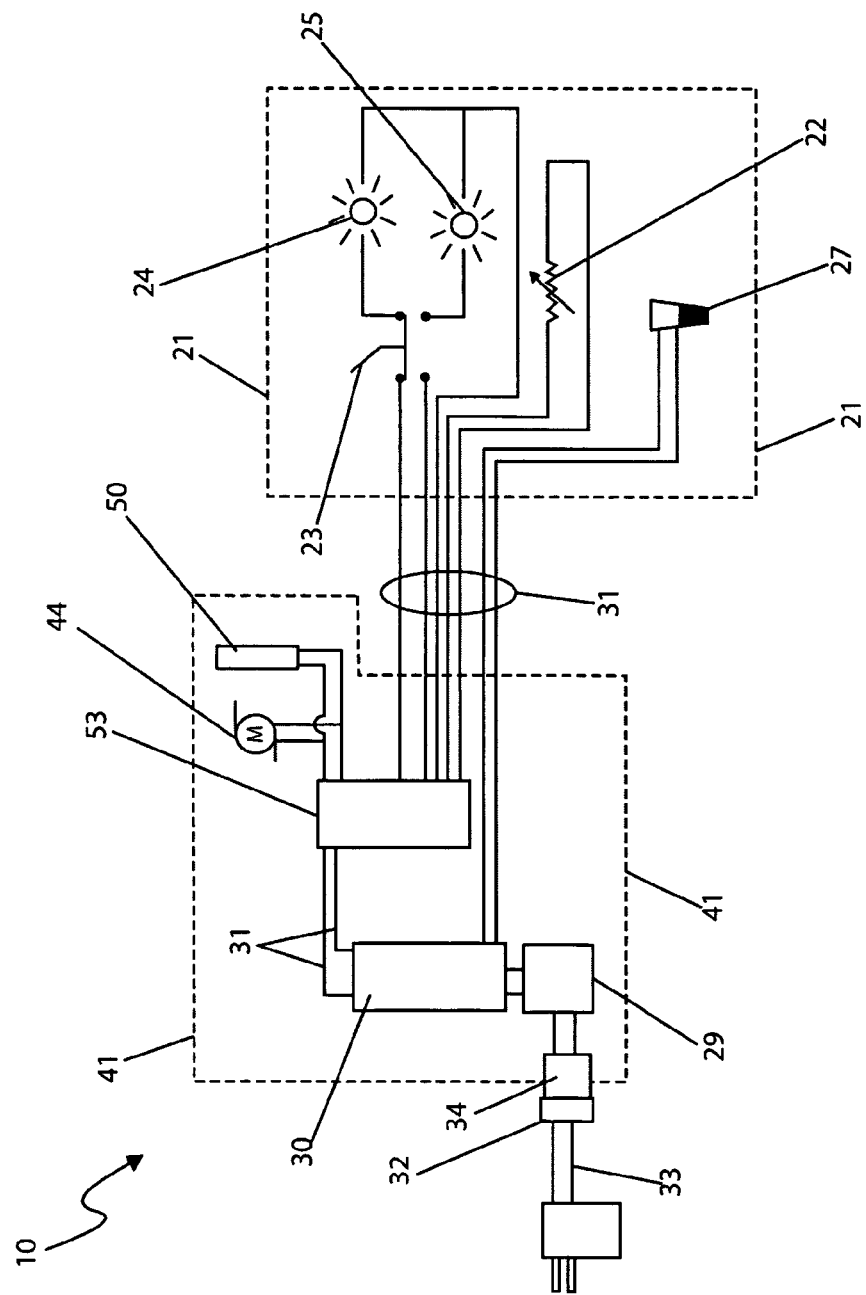

Referring now to FIG. 6, an electrical block diagram depicting control and drive portions of the apparatus 10, according to a preferred embodiment of the present invention, is disclosed. The apparatus 10 comprises a drive assembly 40, an AC/DC recharging cord 33, a first electrical connector 32, a second electrical connector 34, a battery 30, a speed control module 53, a DC motor 44, an electric clutch 50, and interconnecting wiring 31. Power is provided thereto the drive assembly 40 via a rechargeable deep-cycle battery 30 which receives a recharging current therefrom a 110-volt AC to 12-volt DC adapter cord 33 being plugged into a household receptacle in an expected manner. The output 12-volt DC power is then conditioned/regulated to provide a charging current thereto the battery 30 using a standard recharge unit 29. In use, the AC/DC recharging cord 33 is removed and power therefrom the battery 30 is conducted thereto the speed control module 53 which comprises electronic and electrical components necessary for operation such as, but not limited to: printed circuit boards, microprocessors, embedded software, signal input circuitry, and current output circuitry. During use, the speed control module 53 receives input signals therefrom the ON/OFF switch 23 and the control lever 22. The speed control module 53 in turn provides switching logic, thereby directing a variable output current thereto the DC motor 44. The DC motor 44 comprises a one-half (½) to one (1) horsepower commercially available 12-volt electric unit.

The ON/OFF switch portion 23 of the controller assembly 20 comprises a two-position rocker-type switch providing an proportional input signal voltage thereto the speed control module 53 as well as electrical power thereto the parallel-wired indicator lights 24, 25, thereby indicating an ON/OFF state of the controller assembly 20 thereto the operator. The controller assembly 20 is in electrical communication therewith the drive assembly 40 via common wiring 31 being routed internally therewithin the tubular frame members 63 and handlebar portions 64 of the stroller assembly 60. The rotary control lever 22 comprises a heavy-duty quarter-turn rheostatic switch providing a proportional signal voltage thereto the speed control module 53 as previously described. The charge indicator 27 is in electrical communication therewith the battery 30 via interconnecting wiring 31 and comprises an illuminated linear analog device using an LCD display, LED lamps, or equivalent illumination technology to graphically communicate a remaining level of stored electrical energy therewithin the battery 30 to the operator of the apparatus 10.

The electrical control system described above depicts a typical variable speed motor control system; however, the apparatus 10 is not limited to a particular control system embodiment, and a person skilled in the art will appreciate that many other electrical control systems comprising various circuitry and components are possible without deviating from the basic concept and as such should not be interpreted as a limiting factor of the apparatus 10.

Additionally it is envisioned that other styles and configurations of the apparatus 10 can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIG. 1.

The method of utilizing the apparatus 10 may be achieved by performing the following steps: providing a fresh electrical charge thereto the battery 30 by connecting the first connector portion 32 of the AC/DC recharging cord 33 thereto the second electrical connector 34; plugging said AC/DC recharging cord 33 thereinto a common household 110-volt duplex outlet for a sufficient period of time to accomplish a charging cycle; disconnecting and storing the AC/DC recharging cord 33; deploying the stroller assembly 60 in a normal manner by extending the frame members 63 upwardly via the hinging members 66, 69; placing and securing an occupying infant or child thereinto the apparatus 10 in a normal fashion; assuming a pushing position therebehind the apparatus 10; grasping the handlebar portion 64 using both hands; pressing the "ON" portion of the ON/OFF switch 23 to energize the drive assembly portion 40 of the apparatus 10; observing the "ON" indicator light 25 to verify said activation; pressing the control lever 22 in a forward proportional manner to energize the motor drive assembly 40, thereby propelling the apparatus 10 forward thereat a desired speed; releasing said control lever 22 to halt a motorized forward motion of the apparatus 10 as needed; applying the emergency brake assembly 70 as needed to slow or stop the apparatus 10 by pressing the emergency brake lever 47 toward the handlebar portion 64; repeatedly utilizing the previously described controls to motivate the stroller assembly 60 thereto a desired destination; deactivating the apparatus 10 by pressing the ON/OFF switch 23 thereto the "OFF" position to discontinue use of the apparatus 10 or to conserve electrical power in the battery 30; utilizing the "free-wheeling" function of the apparatus 10 by pushing the stroller assembly 60 in a normal manual while the ON/OFF switch 23 in the "OFF" position either in an event in which power within the battery 30 is exhausted or to conserve electrical power; removing an occupying infant or child therefrom the apparatus 10 when arriving at a destination; storing or transporting the apparatus 10 by folding the stroller assembly 60 downward into a compact form; and, benefiting from a significantly reduced effort required to propel a stroller 60 and occupying child to/from a destination using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A folding stroller comprising:
   said stroller, comprising a hinged and foldable tubular frame supporting a seat, a pair of front wheels pivotally attached thereto a lower frontal portion thereof said frame, a pair of rear wheels interconnected by an axle shaft and attached thereto a lower rear portion thereof said frame, a tray providing a frontal secure restraint thereto an occupant residing therein said seat, a foot rest located thereabove said pair of front wheels, and a handlebar attached thereto an upper rear portion thereof said frame;
   a propelling means attachable thereto said stroller for driving said stroller, further comprising:
      an emergency brake assembly;
      a drive assembly in electrical communication therewith said propelling means, further comprising:
         a drive housing, attached to a lower central portion of said frame and providing a protective enclosure for said drive assembly;
         a motor in electrical communication with a controller assembly;
         a motor shaft extending outwardly from said motor;
         a chain and sprocket assembly extending perpendicularly from said axle shaft to said motor shaft and driven by said motor shaft; and,
         an electric clutch in electrical communication with said controller assembly mounted to said motor shaft for selectable engagement with said chain and sprocket assembly; and,
      said controller assembly for providing a control means thereto said drive assembly;
   wherein an operator activates said propelling means;
   wherein said propelling means propels said stroller;
   wherein when drive assembly is disengaged therefrom said propelling means, said stroller can be operated with a manual means;
   wherein said drive assembly provides a torque means to said axle shaft of said pair of rear wheels;
   wherein said motor drives said motor shaft and said motor shaft drives said chain and sprocket assembly;
   wherein said chain and sprocket assembly drives said axle shaft of said pair of rear wheels and propels said stroller when engaged with said electric clutch; and,
   wherein said manual means is used to propel said stroller when said chain and sprocket assembly is disengaged with said electric clutch.

2. The stroller of claim 1, wherein said stroller further comprises an adjustable and removable harness for securing said occupant therein said seat.

3. The stroller of claim 1, wherein said stroller further comprises a sunshade attached thereto an upper portion thereof said frame and an insect screen deployable therefrom said sunshade, thereby providing a full shade thereto said occupant therein said seat.

4. The stroller of claim 1, wherein said drive housing further comprises a rugged structure having a generally cylinder shape of which a long straight side portion thereof extends therebetween said pair of rear wheels and encompasses a portion thereof said axle shaft.

5. The stroller of claim 1, wherein said chain and sprocket assembly further comprise a link chain and a flange-mount sprocket.

6. The stroller of claim 1, wherein said motor comprises a one-half (½) to one (1) horsepower motor capable of providing a sufficient torque means thereto said axle shaft so as to propel said stroller and said occupant secured therein.

7. The stroller of claim 1, wherein said controller assembly further comprises:
   a controller housing located along a rearward facing surface of said handlebar and further comprising:
      an ON/OFF switch receiving power therefrom a power source, selectable therebetween an "ON" position and an "OFF" position;
      an "OFF" indicator light in electrical communication therewith said ON/OFF switch for indicating said "OFF" position thereof;
      an "ON" indicator light in electrical communication therewith said ON/OFF switch for indicating said "ON" position thereof;
   a control lever in electrical communication therewith said ON/OFF switch, comprising an appendage attachable thereto said handlebar operable thereby said operator; and,
   a speed control module actuated thereby said control lever and in electrical communication therewith said motor;
   wherein said "ON" position provides power thereto said control lever;
   wherein said "ON" position disengages said electric clutch; and,
   wherein when said control lever is actuated thereby said operator, said speed control module provides a variable speed output thereto said motor dependent on an actuating pressure thereon said control lever.

8. The stroller of claim 7, wherein said power source further comprises:
   a battery located therewithin said drive housing; and,
   a battery charge indicator in electrical communication therewith said battery and said ON/OFF switch for indicating a remaining power level thereof said battery;
   wherein said battery indicator provides a visual means for indicating a remaining power therewithin said battery.

9. The stroller of claim 8, wherein said battery is recharged therewith an AC/DC recharging cord connected thereto a conventional AC power source thereby connector of a first electrical connector therewith a second electrical connector thereof said battery.

10. The stroller of claim 7, wherein said control lever further comprises an "L"-shaped appendage with a spring-return rotary actuator particularly designed to be actuated using a single digit thereof said operator while maintaining a secure grasp thereof said handlebar.

11. The stroller of claim 7, wherein said emergency brake assembly further comprises:
   an emergency brake lever mounted therealong and hingedly extending forward therefrom a forward-facing side of said handlebar opposite said controller assembly via a lever bracket;
   a brake cable attached at a proximal end thereto said brake lever, comprising an inner wire rope protected by a sheath;
   a brake mechanism connected thereto a distal end thereof said brake cable and located therewithin said drive housing, further comprising:
      a cable fixture located at said distal end thereof said brake cable;
      a split cable connected thereto said distal end thereof said brake cable and routed therethrough said cable fixture, split thereinto a first portion and a second portion;

a first brake lever, comprising a first upper portion fastened thereto said first portion thereof said split cable and pivotally joined thereto an intermediate location thereof a second brake lever, comprising a second upper portion fastened thereto said second portion thereof said split cable;

a first brake pad affixed thereto a first bottom portion thereof said first brake lever;

a second brake pad affixed thereto a second bottom portion thereof said second brake lever; and, a rotor circumferentially attached thereto said axle shaft;

wherein said first brake pad and said second brake pad are positioned so as to contact said rotor when actuated to provide a braking force thereto;

wherein said actuation thereof said emergency brake lever by said operator communicates a force transferred thereto said cable, thereto said split cable, and thereto said first brake lever and said second brake lever;

wherein said force pivotally moves said first brake pad and said second brake pad together to contact said rotor, thereby producing said braking force; and, wherein said brake cable is routed therealong said frame thereof said stroller.

12. A folding stroller comprising:

said stroller, comprising a hinged and foldable tubular frame supporting a seat, a pair of front wheels pivotally attached thereto a lower frontal portion thereof said frame, a pair of rear wheels interconnected by an axle shaft and attached thereto a lower rear portion thereof said frame, a tray providing a frontal secure restraint thereto an occupant residing therein said seat, a foot rest located thereabove said pair of front wheels, a handlebar attached thereto an upper rear portion thereof said frame, an adjustable and removable harness for securing an occupant therein said seat, a sunshade attached thereto an upper portion thereof said frame, and an insect screen deployable therefrom said sunshade;

a drive assembly attachable thereto said stroller for driving said stroller;

a controller assembly in electrical communication therewith said drive assembly for providing a control means thereto said drive assembly;

an emergency brake assembly for providing a braking means thereto said drive assembly;

a drive housing, comprising a rugged, generally cylindrical body attached to a lower central portion of said frame, with a portion encompassing said axle shaft between said pair of rear wheels and providing a protective enclosure for said drive assembly;

a motor in electrical communication with said controller assembly;

a motor shaft extending outwardly from said motor;

a chain and sprocket assembly extending perpendicularly from said axle shaft to said motor shaft and driven by said motor shaft; and, an electric clutch in electrical communication with said controller assembly mounted to said motor shaft for selectable engagement with said chain and sprocket assembly;

wherein an operator activates said controller assembly;

wherein when drive assembly is disengaged, said stroller can be operated with a manual means;

wherein said drive assembly provides a torque means to said axle shaft of said pair of rear wheels;

wherein said motor drives said motor shaft and said motor shaft drives said chain and sprocket assembly;

wherein said chain and sprocket assembly drives said axle shaft of said pair of rear wheels and propels said stroller when engaged with said electric clutch; and, wherein said manual means is used to propel said stroller when said chain and sprocket assembly is disengaged with said electric clutch.

13. The stroller of claim 12, wherein said motor comprises a one-half (½) to one (1) horsepower motor capable of providing a sufficient torque means thereto said axle shaft so as to propel said stroller and said occupant secured therein.

14. The stroller of claim 13, wherein said emergency brake assembly further comprises:

an emergency brake lever mounted therealong and hingedly extending forward therefrom a forward-facing side of said handlebar opposite said controller assembly via a lever bracket;

a brake cable attached at a proximal end thereto said brake lever, comprising an inner wire rope protected by a sheath;

a brake mechanism connected thereto a distal end thereof said brake cable and located therewithin said drive housing, further comprising:

a cable fixture located at said distal end thereof said brake cable;

a split cable connected thereto said distal end thereof said brake cable and routed therethrough said cable fixture, split thereinto a first portion and a second portion;

a first brake lever, comprising a first upper portion fastened thereto said first portion thereof said split cable and pivotally joined thereto an intermediate location thereof a second brake lever, comprising a second upper portion fastened thereto said second portion thereof said split cable;

a first brake pad affixed thereto a first bottom portion thereof said first brake lever;

a second brake pad affixed thereto a second bottom portion thereof said second brake lever; and, a rotor circumferentially attached thereto said axle shaft;

wherein said first brake pad and said second brake pad are positioned so as to contact said rotor when actuated to provide a braking force thereto;

wherein said actuation thereof said emergency brake lever by said operator communicates a force transferred thereto said cable, thereto said split cable, and thereto said first brake lever and said second brake lever;

wherein said force pivotally moves said first brake pad and said second brake pad together to contact said rotor, thereby producing said braking force; and, wherein said brake cable is routed therealong said frame thereof said stroller.

15. The stroller of claim 12, wherein said controller assembly further comprises:

a controller housing located along a rearward facing surface of said handlebar and further comprising:

battery located therewithin said drive housing;

an ON/OFF switch receiving power therefrom said battery, selectable therebetween an "ON" position and an "OFF" position;

an "OFF" indicator light in electrical communication therewith said ON/OFF switch for indicating said "OFF" position thereof;

an "ON" indicator light in electrical communication therewith said ON/OFF switch for indicating said "ON" position thereof;

a control lever in electrical communication therewith said ON/OFF switch, comprising an appendage attachable thereto said handlebar operable thereby said operator;

a speed control module actuated thereby said control lever and in electrical communication therewith said motor; and, a battery charge indicator in electrical communication therewith said battery and said ON/OFF switch for indicating a remaining power level thereof said battery, wherein said "ON" position provides power thereto said control lever;

wherein said "ON" position disengages said electric clutch;

wherein when said control lever is actuated thereby said operator, said speed control module provides a variable speed output thereto said motor dependent on an actuating pressure thereon said control lever; and, wherein said battery indicator provides a visual means for indicating a remaining power therewithin said battery.

16. The stroller of claim 15, wherein said control lever further comprises an "L"-shaped appendage with a spring-return rotary actuator particularly designed to be actuated using a single digit thereof said operator while maintaining a secure grasp thereof said handlebar.

17. The stroller of claim 16, wherein said battery is recharged therewith an AC/DC recharging cord connected thereto a conventional AC power source thereby connector of a first electrical connector therewith a second electrical connector thereof said battery.

* * * * *